May 16, 1961 J. D. WINN 2,984,025
EXCAVATING APPARATUS
Filed June 5, 1959 2 Sheets-Sheet 1
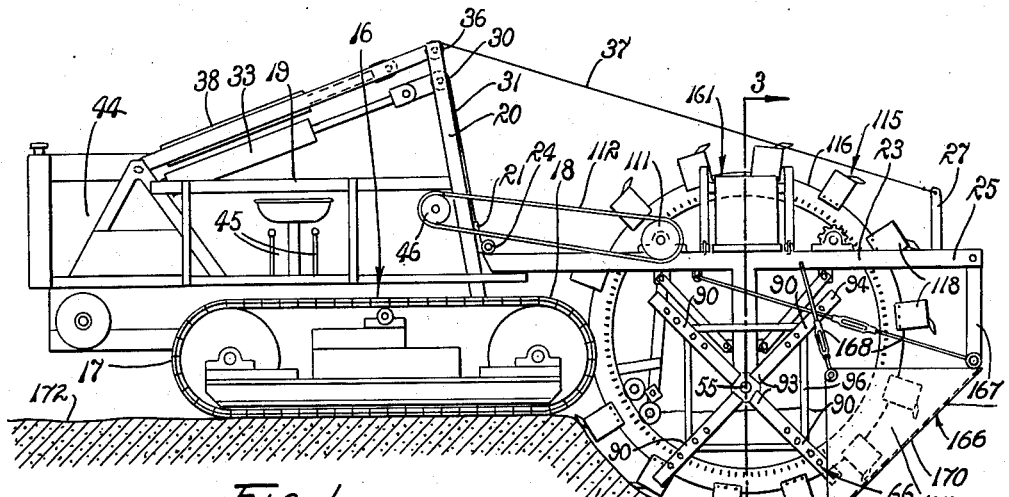
FIG. 1.
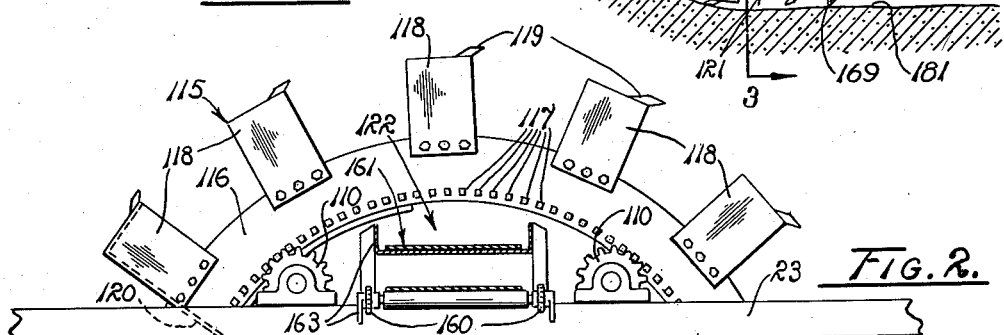
FIG. 2.
JOHN D. WINN
INVENTOR
HUEBNER & WORREL
ATTORNEYS
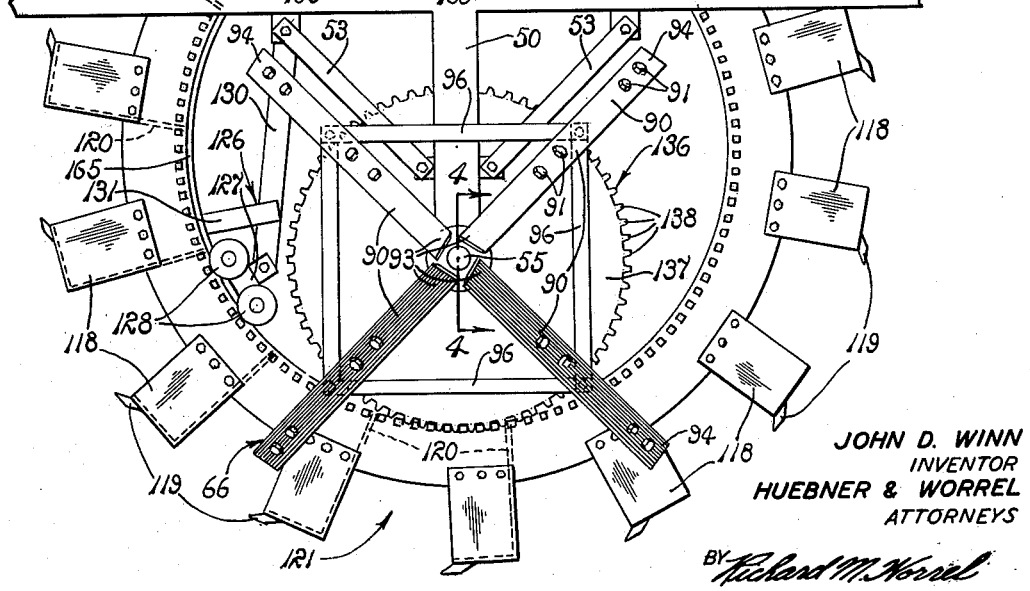

May 16, 1961 J. D. WINN 2,984,025
EXCAVATING APPARATUS
Filed June 5, 1959 2 Sheets-Sheet 2

JOHN D. WINN
INVENTOR
HUEBNER & WORREL
ATTORNEYS 2,984,025
Patented May 16, 1961

2,984,025

EXCAVATING APPARATUS

John D. Winn, Rte. 2, Box 505, Woodland, Calif.

Filed June 5, 1959, Ser. No. 818,318

4 Claims. (Cl. 37—97)

The present invention relates to an excavating apparatus and more particularly to an apparatus for digging a channel in the ground for use as an irriagtion ditch, canal, or the like.

In areas of the world where irrigation is relied upon for crop and plant growth, it is known to convey water long distances from the sources thereof to the points of use in man-made channels or irrigation ditches. While such channels are sometimes merely roughly dug out of the ground and the water allowed to flow therein, it is preferable carefully to form such a channel with a smooth bottom wall or bed and smooth side walls or banks substantially equally angularly divergently upwardly extended from the bottom wall. These ground walls are then covered with concrete to provide hard, durable, and smooth water conducting surfaces which avoid the excessive seepage losses of unlined ditches.

While mechanical ditching equipment has long been known, such equipment forms trenches having vertical side walls. When such ditches are formed preliminary to the excavation of the channels having substantially horizontal bottoms and side walls upwardly and outwardly extended therefrom, extensive subsequent hand operations or mechanical digging is required to achieve the desired channel form. Prior to the present invention, no apparatus had been known capable of forming such a channel in a single continuous operation.

Accordingly, it is an object of the present invention to provide an improved excavating apparatus for channels and the like.

Another object is to provide an excavating apparatus adapted to excavate a channel having a substantially horizontal bottom and upwardly divergent sides in a single operation.

Another object is to form an irrigation channel in ground and to remove the dirt from the channel so formed in a single operation.

Another object is to minimize the time and labor required to dig irrigation channels and the like.

Another object is to provide an apparatus for digging an irrigation ditch and to provide the same with substantially smooth bottom and side walls.

Another object is to provide an apparatus of the nature described which is readily adjustable to dig ditches having various widths and depths.

Another object is to protect earth engaging rotors and rotary driving mechanism therefor, in an apparatus of the nature described, and especially to protect against breakage or deformation of such parts upon engagement of the rotors with obstructions in their path of movement in the ground.

Other objects are to provide a channel digging apparatus which is dependable in operation, which is easy to operate and maintain, and which is excellently suited for accomplishing its intended purposes.

These, together with other objects, will become more fully apparent upon reference to the following description and accompanying drawings.

In the drawings:

Fig. 1 is a side elevation of a channel digging apparatus embodying the principles of the present invention shown in operating position in the digging of a channel in the ground.

Fig. 2 is a somewhat enlarged, fragmentary side elevation of a part of the apparatus of Fig. 1.

Figure 3:
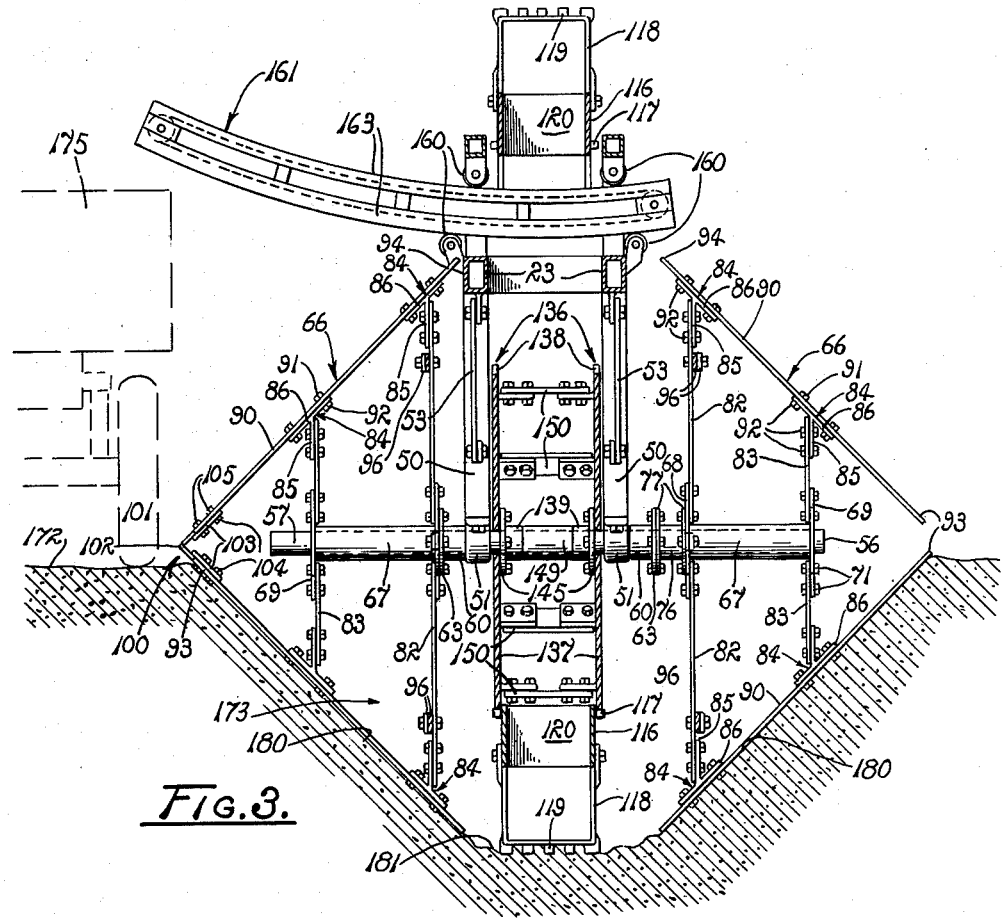
Fig. 3 is a somewhat enlarged transverse section taken on line 3—3 of Fig. 1 and also showing a part of a truck, as is sometimes used with the subject apparatus, in dashed lines.

Referring more particularly to the drawings, the channel digging apparatus of the present invention includes a track laying tractor 16, or other prime mover, having a forward end portion 17 and a rearward end portion 18. A frame, generally indicated by the numeral 19, is borne by the tractor and includes an upwardly extended mast 20 at the rearward end portion of the tractor. A carriage 21 is supported on the mast for elevational adjustable movement. A pair of transversely spaced beams 23 provide forward ends pivotally connected to the carriage by pins 24 for elevational movement about a substantially horizontal axis extended transversely of the path of movement of the tractor. The beams extend rearwardly from the tractor, as is best seen in Fig. 1 and provide rear ends 25. Posts 27 are rigidly upwardly extended from the rear ends of the beams.

Pulleys 30 are journaled in the mast 20, and cables 31 extend over the pulleys and have lower ends connected to the carriage 21. Carriage elevating rams 33 provide forward ends pivotally connected to the frame 19 and rearward ends connected to the cables 31. When the rams are contracted, the carriage 21 and thus the beams 23 are elevated. Extension of the rams lowers the carriage and the beams.

Upper pulleys 36 are also journaled in the mast 20, and cables 37 are trained over the upper pulleys and have rear ends connected to the posts 27. Beam adjusting rams 38 have forward ends pivotally connected to the frame 19 and rearward ends connected to the cables 37. By contracting and extending the rams 38, it will be evident that the rear ends 25 of the beams 23 may be raised and lowered respectively.

It is also to be observed that the tractor 16 has an engine 44 constituting a source of power for driving the subject apparatus. Control levers 45 are provided for operating the rams 33 and 38. A drive pulley 46 is supported on the frame 19 at the rear end portion 18 of the tractor and is rotated by the engine 44 in a manner not specifically illustrated but which will be apparent to those skilled in the art.

Figure 4:
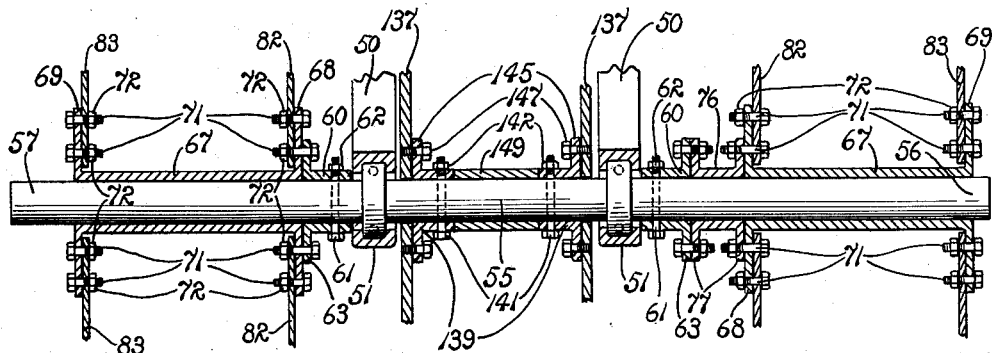
Fig. 4 is a still further enlarged, fragmentary transverse section taken on line 4—4 of Fig. 2.

Support arms 50 have upper ends rigidly connected to the beams 23 intermediate their forward and rearward ends and downwardly extended lower ends providing transversely spaced, axially aligned bearings 51. Diagonal braces 53 pivotally interconnect the beams and the arms and thereby impart rigidity to the arms. An elongated shaft 55 is rotatably journaled in the bearings in a substantially horizontal position extended transversely of the path of movement of the tractor 16. This shaft has opposite end portions 56 and 57 transversely outwardly extended from the bearings, as best seen in Fig. 3 and 4.

Mounting collars 60 are slidably received over the opposite end portions 56 and 57 of the shaft 55 and are in endward abutment with the bearings 51. Elongated bolts 61 are extended transversely through the collars and the shaft, and nuts 62 are screw-threaded on the bolts to lock the collars against rotation relative to the shaft.

The collars have radially outwardly extended annular flanges 63 in axially spaced relation to their respectively adjacent bearings.

Substantially conically-shaped, earth engaging rotors 66 are mounted on the shaft 55 in back-to-back, axially spaced relation. The rotors include elongated tubular hubs 67 slidably endwardly received on the opposite end portions 56 and 57 of the shaft. Each hub has axially spaced, radially outwardly extended, annular inner and outer flanges 68 and 69. With reference to Fig. 4, the inner flange of the left rotor, as there illustrated, is directly connected to the flange 63 of the left mounting collar 60 by means of shear pins 71 extended through the mating flanges, and nuts 72 are screw-threaded on the pins. The right rotor, as illustrated in Fig. 4, may also be connected directly to its adjacent mounting collar 60 but in the illustrated embodiment, a tubular extension sleeve 76 is slidably received on the shaft 55 between the right rotor and the right mounting collar. This extension sleeve has inner and outer flanges 77 respectively connected to the flange of the right mounting collar and to the inner flange of the right rotor by means of shear pins 71 and nuts 72. It is to be understood that the sleeve could just as well be provided between the left rotor and left mounting collar, as seen in Fig. 4, could be omitted entirely, or could be provided between both left and right rotors and their respective mounting collars. The purpose of the extension sleeve will be evident hereinafter.

The rotors 66 also include inner and outer spokes 82 and 83, respectively, extended radially outwardly from the inner and outer flanges 68 and 69 of the rotors and in circumferentially spaced relation to each other, as illustrated in Fig. 2. The spokes are connected to their respective flanges by means of the shear pins 71 and are located between their respective flanges and the nuts 72. The spokes include brackets 84 having radial mounting plates 85 and blade supporting plates 86 angularly related to the mounting plates. Further, the blade supporting plates on adjacent corresponding inner and outer spokes are in a substantially common plane with each other, as seen in Fig. 3.

The rotors 66 provide elongated earth engaging blades 90 connected to the supporting plates 86 by means of bolts 91 and nuts 92. The blades of each rotor provide convergent outer ends 93 of minimum diameter in endwardly spaced relation to the respectively adjacent end portions 56 or 57 of the shaft 55, and opposite divergent inner ends 94 of maximum diameter. The convergent outer ends of the blades define an apex portion of each rotor. Elongated struts 96 interconnect adjacent spokes 82 and 83 of the rotors for imparting rigidity thereto.

One of the rotors 66 has a generally pyramidal apex section 100 having blade portions 101 endwardly extended from the outer ends 93 of the blades 90 and meeting in a tip 102. Mounting plates 103 are secured to the blade portions and are marginally overlapped by the outer ends of the blades. Bolts 104 are extended through the overlapped plates and blades, and nuts 105 are connected to the bolts for releasably mounting the apex section on the blades. Although not shown, the other rotor may include such an apex section, or under certain conditions, the apex sections are entirely omitted.

With particular reference to Fig. 2, forward and rearward pairs of support gears 110 are rotatably mounted on the beams 23 with the gears in each pair being in transversely spaced axially aligned relation with respect to each other. A driven pulley 111 is secured for rotation with the forward support gears, and an endless flexible pulley belt 112 extends around the driven pulley and the drive pulley 46 on the tractor 16. It is evident, therefore, that the drive and driven pulleys are in a common vertical plane.

An annular substantially circular rotary pick up conveyer 115 is positioned between the beams 23 and the arms 50 in circumscribing relation to the shaft 55 and includes a pair of axially spaced ring gears 116. The ring gears have transversely outwardly extended, equally peripherally spaced gear teeth 117 in mesh with forward and rearward support gears 110 on their respectively adjacent beams. It will therefore be evident that when the forward pair of support gears is rotated by the drive pulley 46, the ring gears are similarly rotated about their common axis. The gears 110 support the ring gears in concentric relation to the shaft, as will be evident in Fig. 2. A plurality of receptacles or buckets 118 rigidly interconnect the ring gears and are in substantially equally circumferentially spaced relation about the shaft. Further, the receptacles extend substantially radially outwardly with respect to the shaft and have teeth 119 extended forwardly relative to the direction of rotation of the conveyer. Each receptacle has a rear inner wiper 120 extended radially inwardly toward the shaft and for a purpose to be described hereinafter. Accordingly, upon rotation of the conveyor, the receptacles move successively from lower material receiving positions, indicated generally by the numeral 121, to upper material discharging positions, indicated generally by the numeral 122, and return.

To prevent upward movement of the conveyer 115 relative to the support gears 110, a hold-down mechanism 126 is provided and includes a mounting block 127 rotatably supporting pairs of rollers 128 rollably engaging inner rims of the ring gears 116 of the conveyer. An elongated support rod 130 pivotally interconnects the mounting block and the beams 23, and a control rod 131 is connected to the support rod and extended forwardly toward the tractor 16. Forward tension on the control rod holds the rollers against the rims of the ring gears 116. Although not shown, the control rod is adapted for connection to the frame 19 in an adjustable manner so that the rollers can be moved rearwardly out of engagement with the ring gears.

With particular reference to Figs. 2, 3 and 4, a pair drive gears 136 is slidably received on the shaft 55 in axially spaced relation between the arms 50. Each drive gear includes a circular plate 137 having peripheral gear teeth 138 individually in mesh with the teeth 117 of the respectively adjacent ring gear 116. Each drive gear also has a hub 139 connected to the shaft by means of bolts 141 and nuts 142. The hubs have annular flanges 145 against their respective plates, and shear pins 147 extend through the abutting flanges and plates so that the drive gears are connected to the shaft for imparting rotation thereto. A spacing tube 149 is slidably fitted on the shaft between the hubs of the drive gears. Further, bars 150 rigidly interconnect the drive gears for unitary rotation. From the foregoing, it will be understood that rotation of the conveyer 115 drives the gears 136 which in turn impart rotation to the shaft and the rotors 66.

As best seen in Fig. 3, upper and lower, forward and rearward sets of positioning gears 160 are mounted on the beams 23 for rotation about substantially parallel axes right-angularly related to the shaft 55. An upwardly concave, discharge conveyer 161 is cradled on the lower set of positioning gears, and is in engagement with the upper set of such gears. More specifically, the discharge conveyer provides upper and lower, longitudinally extended side racks 163 in mesh with the gears 160. The discharge conveyer is thus mounted in the frame for adjustable movement transversely of the direction of travel of the tractor 16 and beneath the discharging position 122 of the rotary conveyer 115. Although not shown, this adjustment of the discharge conveyer is accomplished by controlled rotation of one of the positioning gears.

An elongated arcuate shield 165 is mounted in the frame 18 in concentric relation to the shaft 55 and extends throughout an arc of greater than 90° from an upper position laterally adjacent to the discharge conveyer 161 to a lower position relatively adjacent to the mounting block 127 and rollers 128 of the hold-down mechanism 126. The shield is substantially coincident with the inner rim of the ring gears and extends between the ring gears. The wipers 120 of the receptacles 118 slidably engage, or are closely adjacent to, the shield during movement of the receptacles from their receiving position 121 into their discharging position 122 for a purpose subsequently to be evident.

A scoop 166 is pivotally supported from the rear ends 25 of the beams 23 by links 167 and is further adjustably supported from the beams by means of elongated adjustable tension rods 168. The scoop is thus positioned rearwardly of the rotary conveyer 115 and has a rearwardly inclined rear wall 169 terminating in a lower front ground engaging edge 170. Further, the scoop has a pair of triangular side wings 171 laterally outwardly extended from the rear wall.

*Operation*

The operation of the described embodiment of the subject invention is believed to be readily apparent and is briefly summarized at this point.

The tractor 16 is driven on the surface 172 of the ground in a forward path of travel corresponding to the desired path of a channel or ditch 173 to be dug. By operating the rams 33 and 38, the rotors 66 and rotary conveyer 115 are elevationally adjusted in accordance with the desired depth of the channel to be dug. Rotation is imparted to the drive pulley 46 on the tractor so that the rotors 66 and the rotary conveyer 115 are turned. It is to be noted that both the rotors and the rotary conveyer rotate in a clockwise direction, as viewed in Fig. 1.

The rotor blades 90 engage earth laterally of the rotary conveyer 115 and cause such earth to slide downwardly toward the receiving position 121 where such dirt is picked up by the receptacles 118 and carried upwardly therewith. Of course, dirt initially directly in advance of the receptacles is also picked up thereby and conveyed upwardly. As the receptacles move along their upward path, the wipers 120 engage the shield 165 and sweep any dirt falling from the receptacles along the shield to the discharging position 122.

The elevated dirt is dumped onto the discharge conveyer 161 which is adjusted to extend laterally outwardly from the apparatus over the ground at one side of the channel 173 being dug. A truck, as indicated at 175, is driven along one side of the subject apparatus underneath the discharge conveyer and receives dirt conveyed transversely outwardly of the apparatus by the discharge conveyer.

It will be evident, therefore, that the rotors 66 cut and form substantially equally angularly, upwardly divergent side walls or banks 180 of the channel 173 while the rotary conveyer 115 forms a bottom wall or bed 181 inerconnecting the side walls and removes all of the dirt from the channel formed. The lower edge 169 of the scoop 166 and the wings 171 thereof scrape along the bottom wall and the side walls, respectively, of the channel and move dirt, which is missed by the blades 90 and the receptacles 118 forwardly in advance thereof into the path of the receptacles 118.

If the rotor blades 90 engage an obstruction, such as a large boulder, embedded roots, or the like, and thereby are prevented from rotating, the shear pins 71 or 147 break off and automatically disconnect the obstructed rotor 66 from the shaft 55. This protects the rotor blades as well as the driving mechanism against deformation and breakage. It will be apparent that breakage of the shear pins is of much less consequence than would be damage to the drive gears 136, the ring gears 116, the support gears 110, or any other more intricate part of the driving mechanism. If such breakage does occur in the shear pins, it is merely necessary to stop the equipment, remove the obstruction, and replace the broken shear pins.

As already explained, the apparatus is designed to dig channels of various depths. Furthermore, the apparatus is transversely adjustable to form channels of various widths. For this purpose, the extension sleeve 76 is interposed one of the rotors 66 and its respectively adjacent mounting collar 60. This moves the rotor to which the sleeve is connected farther outwardly on the shaft 55. Thus, it will be evident that the bottom wall 12 of the channel 11 will have a greater width than when the sleeve is omitted and both rotors are directly connected to their respective mounting collars.

Further, in the event that the apex portion of either of the rotors 66 does not extend up to the surface 172 of the ground, the apex section 100 is connected to the blades 90 of the rotor on the side involved. With the apex section added, the rotor to which it is connected is effective throughout a longer axial distance than when the apex section is omitted.

From the foregoing, it will be evident that a channel digging apparatus has been provided for forming an irrigation channel, in particular, and for removing the dirt from the channel so formed in the same operation. A channel formed by the apparatus of the subject invention provides substantially smooth side and bottom walls which may be subsequently covered with concrete without further surfacing operations. In fact, the subject apparatus is excellently suited for forming a channel immediately in advance of a concrete laying machine which follows the digging apparatus down the channel. Of particular significance in the apparatus are the safety features protecting the driving mechanism against damage when the rotors engage an obstruction in their path and the features enabling adjustment of the apparatus for forming channels of various widths and depths.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An earth excavating apparatus comprising a frame; a pair of elongated beams supported on the frame; means mounting the frame for earth traversing movement longitudinally of the beams; arms individually downwardly extended from the beams in transversely spaced relation to each other; bearings individually mounted on the arms in coaxial alignment transversely of the beams, each beam and its connected arm and bearing being disposed in a substantially common vertical plane disposed longitudinally of beams; an elongated shaft having opposite end portions and being rotatably journaled in the bearings between said end portions so that the latter extend outwardly on opposite sides of said vertical planes of the beams and the bearings; substantially conical, earth-digging rotors having tubular hubs individually, releasably, endwardly, slidably fitted on opposite end portions of the shaft, spokes rigidly radially outwardly extended from the hubs, and blades connected to the spokes in substantially conical, concentric formation about the shaft and convergently endwardly extended with respect to the opposite end portions of the shaft, the rotors thereby having inner portions of maximum diameter in axially spaced relation to each other on opposite sides of said common vertical planes of the beams and bearings and outer apical portions of minimum diameter endwardly outwardly spaced from their respectively adjacent end portions of the shaft; mounting collars rotatably fitted on the end portions of the shaft individually between the rotor hubs and the bearings; a drive gear including a hub rotatably mounted on the shaft between the bearings; shear pins interconnecting the respectively adjacent mounting collars and rotor hubs and connecting the shaft to the drive gear hub and to the mounting collars; an annular rotary conveyer; means borne by the beams rotatably supporting the conveyor between the beams, in circumscribing relation to the shaft, and for rotation about an axis upwardly offset from the shaft, the conveyor and the drive gear having driven interconnection whereby rotation of the conveyer imparts rotation to the drive gear; and powered means borne by the frame having driving connection to the conveyer.

2. In an earth excavating apparatus, a support mounted for earth traversing movement along a predetermined path of travel in relation to said support; an elongated shaft having opposite end portions and being rotatably journaled in the support in a substantially horizontal position extended transversely of said path of travel; earth digging rotors having hubs individually, releasably, endwardly, slidably fitted on the opposite end portions of the shaft, the rotors also having inner portions in spaced relation to each other, and outer portions respectively relatively adjacent to the end portions of the shaft, mounting collars rotatably fitted on the end portions of the shaft inwardly individually adjacent to the rotor hubs; a drive gear including a hub rotatably mounted on the shaft between the mounting collars; shear pins interconnecting the respectively adjacent mounting collars and rotor hubs; shear pins connecting the shaft to the drive gear hub and to the mounting collars; an annular rotary conveyer; means borne by the support rotatably mounting the conveyer between the inner portions of the rotors and in circumscribing relation to the shaft, the conveyor and the drive gear having driven interconnection whereby rotation of the conveyor imparts rotation to the drive gear; and powered means borne by the support having driving connection to the conveyer.

3. In an earth excavating apparatus including a support, means mounting the support for earth traversing movement in a predetermined longitudinal path of travel relative to the support, an elongated shaft having opposite end portions, means borne by the support rotatably mounting the shaft in a substantially horizontal position extended transversely of said path of travel, an annular rotary conveyer circumscribing an axis of rotation therefor and having an annular drive member circumscribing said axis, means borne by the support rotatably mounting the conveyer in circumscribing relation to the shaft between the end portions thereof with its axis of rotation upwardly spaced from the shaft; the improvement comprising earth digging rotors having tubular hubs individually releasably, slidably fitted on the opposite end portions of the shaft, inner portions in spaced relation to each other axially of the shaft disposed on opposite sides of the conveyer, and outwardly disposed outer portions; mounting collars rotatably fitted on the end portions of the shaft in individually inwardly adjacent relation to the rotor hubs; a driven member including a hub rotatably mounted on the shaft between the mounting collars and having driven connection with the drive member of the conveyer; and shear pins interconnecting the respectively adjacent mounting collars and rotor hubs and connecting the shaft to the hub of the driven member and to the mounting collars whereby rotation of the conveyer imparts rotation to the shaft through said drive and driven members and said shear pins but whereby said pins shear when the rotors strike obstructions in their paths to prevent damage to the rotors, shaft and mounting means therefor.

4. In combination with a frame, elongated support means borne by the frame, means mounting the frame for earth traversing movement longitudinally of the support means, hangar means borne by the support means and downwardly extended therefrom, bearings individually mounted on the hangar means in spaced coaxial alignment transversely of the support means, an elongated shaft having opposite end portions and being rotatably journaled in the bearings between said end portions so that the latter extend outwardly on opposite sides of said support means, an annular rotary conveyer, means borne by the support means rotatably mounting the conveyer in circumscribing relation to the shaft for rotation about an axis upwardly offset from the shaft, and powered means borne by the frame having driving connection to the conveyer; an earth digging apparatus comprising substantially conical, earth digging rotors having tubular hubs individually releasably, endwardly slidably fitted on opposite end portions of the shaft, inner portions of maximum diameter in axially spaced relation to each other on opposite sides of the conveyer, and outwardly disposed portions of minimum diameter; mounting collars rotatably fitted on the end portions of the shaft individually between the rotor hubs and bearings; a drive gear including a hub rotatably mounted on the shaft between the bearings; and shear pins interconnecting the respectively adjacent mounting collars and rotor hubs and connecting the shaft to the drive gear hub and to the mounting collars, the conveyer and the drive gear having driven interconnection whereby rotation of the conveyer imparts rotation to the drive gear and thereby to the shaft.

References Cited in the file of this patent

UNITED STATES PATENTS

| | | |
|---|---|---|
| 948,871 | Brown | Feb. 8, 1910 |
| 1,284,041 | Bager | Nov. 5, 1918 |
| 1,467,828 | Bentson | Sept. 11, 1923 |
| 1,601,537 | McDonald | Sept. 28, 1926 |
| 2,782,535 | Fuller et al. | Feb. 26, 1957 |
| 2,896,342 | Reising | July 28, 1959 |
| 2,914,866 | Vander Berg | Dec. 1, 1959 |